United States Patent
Robin et al.

[15] 3,668,584

[45] June 6, 1972

[54] ELECTRICAL POWER APPARATUS

[72] Inventors: Harral T. Robin, Muncie; Virgil L. Boaz, Daleville, both of Ind.

[73] Assignee: Westinghouse Electric Corporation, Pittsburgh, Pa.

[22] Filed: Apr. 13, 1971

[21] Appl. No.: 133,488

[52] U.S. Cl. .............................................. 336/60, 174/127
[51] Int. Cl. ....................................................... H01f 27/10
[58] Field of Search ............... 336/55, 58, 60, 195, 105, 150, 336/90, 84, 70; 174/127, 73

[56] References Cited

UNITED STATES PATENTS 1,691,329  11/1928  Austin ................................. 174/127

2,009,854  7/1935  Meissner .............................. 174/127

FOREIGN PATENTS OR APPLICATIONS 639,040  6/1950  Great Britain ....................... 174/127

Primary Examiner—Thomas J. Kozma
Attorney—A. T. Stratton, F. E. Browder and D. R. Lackey

[57] ABSTRACT

Electrical power apparatus, such as a transformer, electrical reactor, or a circuit breaker, having a casing containing fluid cooling means, and at least one electrical lead immersed in the fluid cooling means. The magnitude of the electrical stress is reduced about the electrical lead, without impeding the removal of heat from the lead by the fluid cooling means, by disposing a spirally wound electrode about the electrical lead, and connecting the electrode to the lead.

14 Claims, 6 Drawing Figures

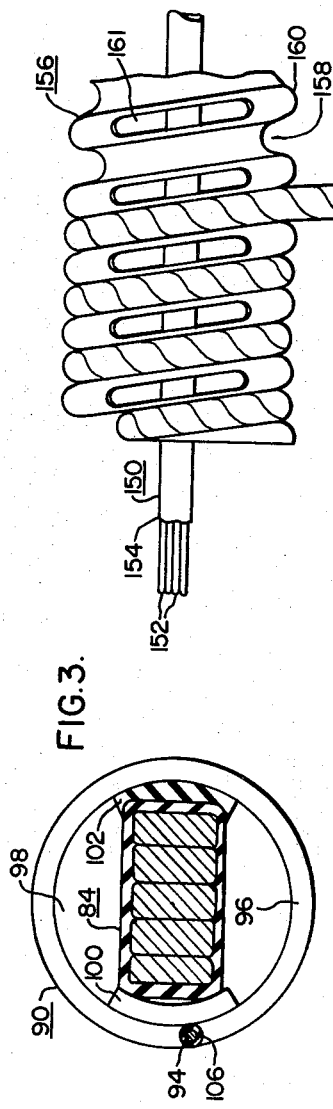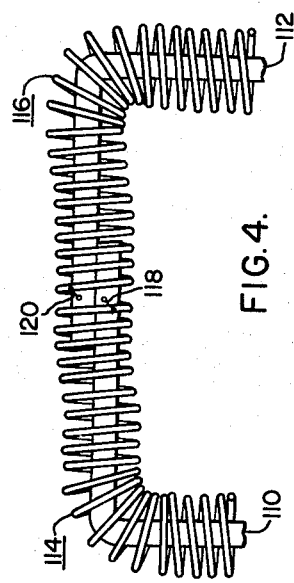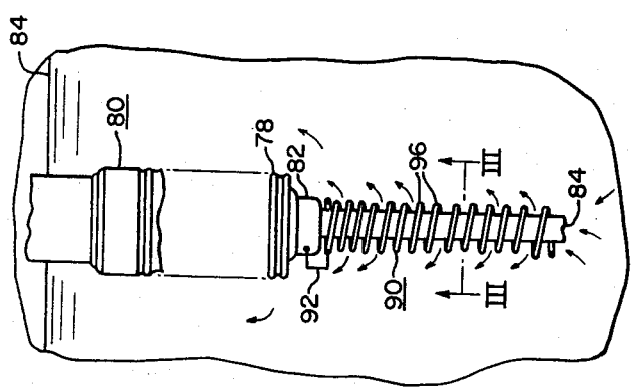

ELECTRICAL POWER APPARATUS

BACKGROUND OF THE INVENTION

1. Field of the Invention

The invention relates in general to electrical power apparatus, such as high voltage power transformers, electrical reactors, and power circuit breakers, and more specifically to structures for reducing the potential gradient about certain portions of such apparatus, while promoting heat removal from these portions.

2. Description of the Prior Art

The trend to higher and higher electrical transmission voltages has introduced special stress control problems in related electrical power apparatus, such as power transformers, shunt reactors, power circuit breakers, and the like. Stress control about high voltage leads disposed directly in the fluid cooling medium of such apparatus is especially troublesome, as present methods of controlling this stress create other problems, the solution to which adds to the manufacturing cost of the apparatus. Examples of such high voltage electrical leads are the electrical leads connected to the bushings in transformers, reactors, and power circuit breakers, tap leads connected between transformer coils and a tap changer, and connections between coil groups of a power transformer. Care must be taken in the design of such apparatus to insure that the electrical stress surrounding these leads does not exceed the electrical breakdown strength of the surrounding fluid cooling dielectric, which is usually mineral oil.

The usual prior art arrangements for lowering the magnitude of the electrical stress surrounding such leads to values below the breakdown strength of the mineral oil consists of wrapping the leads heavily with cellulosic insulation, such as crepe paper. Crepe paper has a higher dielectric strength than mineral oil, and can thus withstand the high electrical stress immediately adjacent to the conductive portion of the electrical lead, and it has a higher dielectric constant than mineral oil, and is thus not as highly stressed as mineral oil would be in the same location. Further, the crepe paper insulation spaces the mineral oil from the lead, reducing the magnitude of the electrical stress at the crepe paper-oil interface.

While this prior art arrangement solves the stress problem, it creates other problems which add to the manufacturing cost of the apparatus. The amount of crepe paper tape required is substantial, and the thickness of this layer of crepe paper tape increases with the voltage level of the lead. Thick layers of paper on the electrical leads lower heat dissipation from the lead into the surrounding cooling medium, causing the lead to operate at higher temperatures than permissible. A predetermined maximum hot-spot temperature must not be exceeded, or the crepe paper tape will deteriorate rapidly.

The reduced effectiveness of the leads in dissipating their $I^2R$ losses due to the thick insulation layer has led to the adding of additional conductive strands to the leads, in order to reduce the magnitude of the $I^2R$ losses, and thus reduce the temperature of the lead structure. This practice, however, is often partially or wholly self-defeating, as the insulated leads are usually disposed in areas of high leakage flux fields, which may create circulating current losses which offset the reduction in $I^2R$ losses. Further, adding additional conductive strands to the leads, and heavy layers of paper tape is undesirable, due to the resulting increased labor and material costs.

Thus, it would be desirable to provide new and improved electrical inductive apparatus having means for reducing the magnitude of the electrical stress surrounding high voltage electrical leads disposed in such apparatus, which is less costly than prior art stress reducing structures, and which maintains lead temperatures within acceptable limits.

SUMMARY OF THE INVENTION

Briefly, the present invention is new and improved electrical power apparatus, such as power transformers, electrical reactors, and power circuit breakers, of the liquid filled type. The magnitude of the electrical stress surrounding at least one electrical lead disposed in such apparatus is reduced by disposing an electrode about the lead, with the electrode having a larger effective radius than the lead. The electrode is formed of an electrical conductor having a plurality of spiraled turns, which turns encircle the lead and are spaced therefrom by spacer means. The electrical conductor of the electrode is connected to the electrical lead, to reduce the potential gradient between the lead and surrounding spaced electrode to substantially zero. Thus, heavy taping of the electric lead is not required and the $I^2R$ losses produced in the lead are readily dissipated into the surrounding liquid coolant. Since the effectiveness of the resulting structure is increased, the potential gradient adjacent the electrode is reduced. Since the electrode carries no current, and thus has no $I^2R$ losses, its effectiveness may be increased by applying solid insulation about its turns, without regard to impeding the heat transfer. The spiraled turns of the electrode allow free flow of the liquid coolant both through the opening defined by the turns, through which the electrical lead extends, and also between the turns of the spiraled electrode.

BRIEF DESCRIPTION OF THE DRAWINGS

The invention may be better understood, and further advantages and uses thereof more readily apparent, when considered in view of the following detailed description of exemplary embodiments, taken with the accompanying drawings, in which:

FIG. 2 is a fragmentary elevational view of a bushing lead including stress reducing means constructed according to the teachings of the invention;

FIG. 3 is a cross-sectional view of the bushing lead and stress reducing means shown in FIG. 2, taken along the lines III—III;

FIG. 4 is a fragmentary view of intercoil connecting leads having stress reducing means constructed according to the teachings of the invention;

FIG. 5 is a fragmentary view of a tap lead having stress reducing means constructed according to the teachings of the invention; and FIG. 6 is a fragmentary view of a lead and stress reducing means constructed according to still another embodiment of the invention.

DESCRIPTION OF PREFERRED EMBODIMENTS

Figure 1:
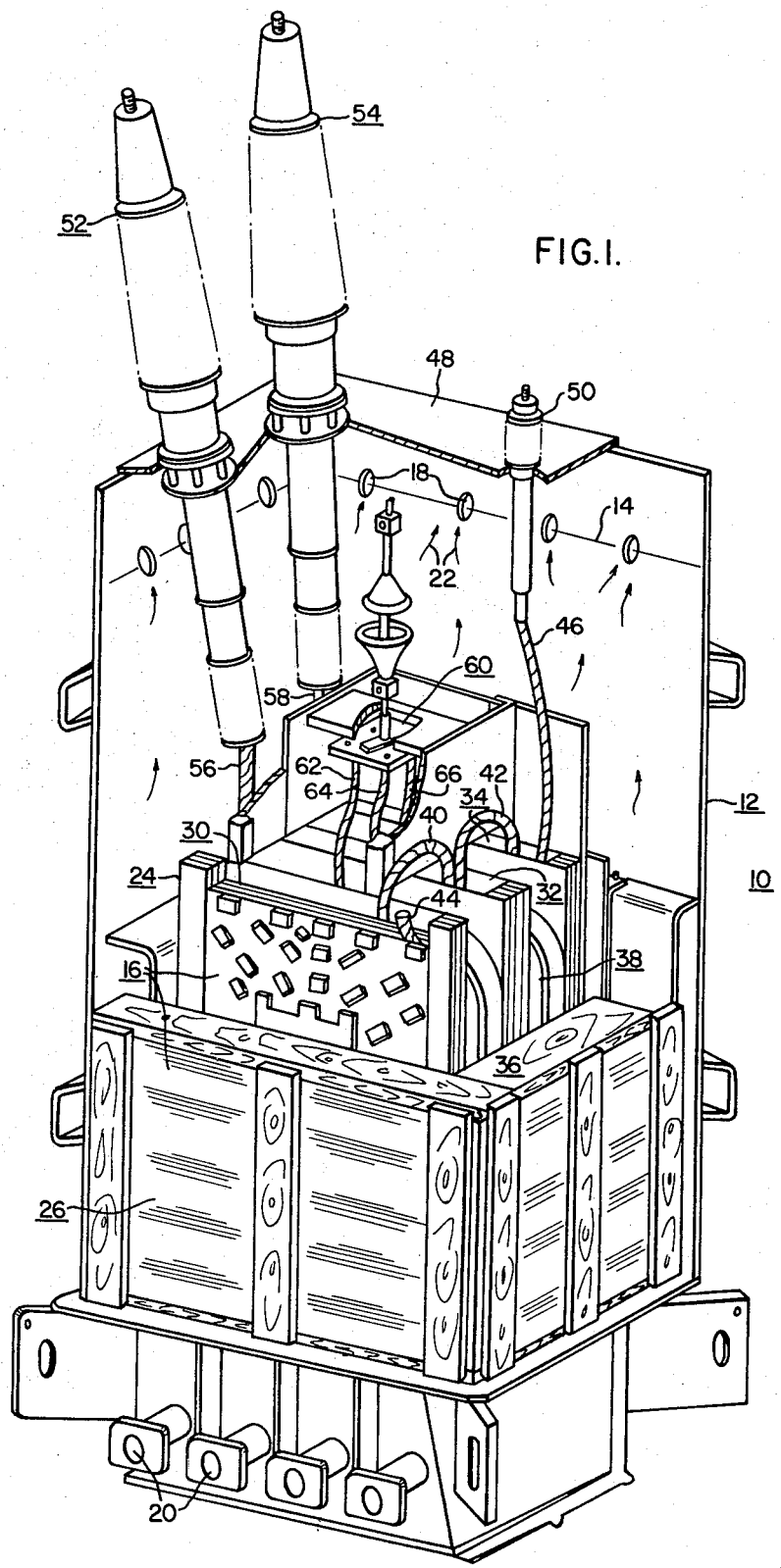
FIG. 1 is a perspective view, partially cut away, of a liquid filled transformer which may utilize the teachings of the invention.

Referring now to the drawings, and FIG. 1 in particular, there is shown a transformer 10, partially cutaway, of the type which may utilize the teachings of the invention. While the transformer 10 is illustrated as being of the shell-form type, it is to be understood that it may be of the core-form type, and it broadly represents high voltage liquid filled power apparatus having electrical leads therein which require special attention from the viewpoint of stress control. Transformer 10 includes a tank 12 filled to a level 14 with a fluid cooling means, such as mineral oil, and a magnetic core-winding assembly 16 disposed in the tank and immersed in the fluid cooling means. The mineral oil aids insulating the electrical windings from ground, and from one another, and it cools the magnetic core-winding assembly 16 by circulating upwardly therethrough, either by forced circulation, or by the natural thermal siphon effect, with the heated oil being cooled by heat exchangers (not shown), which are connected to the tank, in communication with openings 18 near the top of the tank 12, and pipes 20 near the bottom thereof. The oil circulates upwardly through cooling ducts disposed in the magnetic core-winding assembly 16, outwardly from the tank 12 through openings 18, as indicated by arrows 22, through the heat exchangers, and back into the tank 12 through the pipes 20 disposed near the bottom thereof.

The magnetic core-winding assembly 16 of transformer 10, which may be single or polyphase, includes a winding assembly 24 and a magnetic core assembly 26. The winding assembly 24 includes a plurality of high and low voltage coils which encircle leg portions of the magnetic core assembly 26, with the coils being disposed in side-by-side relation, and separated by solid insulating barriers, such as washer type insulating structures formed of pressboard. In this example, first, second and third groups 30, 32 and 34, respectively, of low voltage coils, are provided, separated by first and second groups 36 and 38, respectively, of high voltage coils. The first, second and third groups 30, 32 and 34 of low voltage coils are serially interconnected via electrical leads 40 and 42, and leads 44 and 46 at the ends of the serially connected low voltage coils connect the resulting low voltage winding to low voltage electrical bushings sealingly disposed through the cover portion 48 of the tank 12. For example, lead 46 is illustrated being connected to the terminal on the encased end of a low voltage bushing assembly 50.

In like manner, the first and second groups of high voltage coils are serially interconnected via an electrical lead (not shown), and the ends of the resulting high voltage winding assembly are connected to the terminals on the encased ends of high voltage bushings 52 and 54 via leads 56 and 58, respectively. High voltage bushings 52 and 54, similar to the low voltage bushings, are sealingly disposed through the cover portion 48 of tank 12, with either the high or low voltage bushings being adapted for connection to an electrical potential, depending upon whether the transformer is of the step-up or of the step-down type.

Transformer 10 also includes tap changer means 60, operable from outside the tank 12, through a suitable seal, with the tap changer means 60 having a plurality of contacts connected to a plurality of tap leads from the high voltage coils, such as tap leads 62, 64 and 66.

Within the winding assembly 24, stress control is achieved without loss of cooling efficiency, by careful design of the shapes of the solid insulating structures utilized, and controlling the width of the oil filled cooling ducts, to prevent the potential gradient (volts per mil) from exceeding the electrical breakdown strength of the solid insulation, such as paper and pressboard, and oil filled ducts. Electrical leads outside of the winding assembly 24, such as intercoil leads 40 and 42, the intercoil leads between the high voltage groups, which are not shown, bushing leads 46, 56 and 58, and tap leads 62, 64 and 66, require special attention, as the electrical stress at the lead-oil interface may exceed the breakdown strength of the oil. In the prior art, thick layers of insulation are applied to these leads, using crepe paper tape, which moves the insulation-oil interface further from the metallic portion of the leads, to a point where the voltage gradient is below the electrical breakdown strength of the oil. This solid insulation is able to withstand the high electrical stresses adjacent to the metallic lead conductor, as it has a higher electrical strength than oil, and its higher dielectric constant, i.e., about four compared with about two for oil, reduces the voltage drop across the solid insulation. The thick layers of solid insulation disposed about the electrical leads, however, trap heat generated in the leads due to the $I^2R$ losses, requiring more cross-section of metallic conductor in the leads than would ordinarily be required, in order to reduce the loss in the leads, and thus reduce the amount of heat generated therein. Increasing the number of conductive strands in a lead, however, to increase the cross-sectional area of the lead structure, increases its losses due to circulating currents, as the leads are usually located in a high leakage flux field. Elaborate transpositions of the strands of the lead, to reduce circulating current magnitudes, substantially increase the manufacturing cost of the leads. Thus, it would be desirable to reduce the potential gradient adjacent to these leads, without increasing the manufacturing cost of the leads and without hindering the transfer of heat from the leads to the surrounding cooling oil.

The present invention accomplishes this objective by a structure which reduces the potential gradient surrounding the leads to substantially zero, making it unnecessary to heavily tape the leads, which thus enables heat to be readily removed therefrom, and transfers the stress to an electrode surrounding and spaced from the lead, which electrode is at the electrical potential of the lead, but which carries no current. Thus, solid insulation may be applied to the electrode without regard to trapping heat, as virtually no heat is generated in the electrode structure.

The electrode structure, according to the teachings of the invention, is an electrical conductor which has been spirally wound to provide a plurality of continuous, axially spaced conductor turns, with the inside diameter of the turns defining an opening through which an electrical lead is disposed. The cooling oil is free to flow through the opening in the electrode defined by the plurality of turns, and also through the space between adjacent turns, enabling the lead structure to operate at about the same temperature as the coil to which it is connected. While the turns of the electrode are axially spaced, they are close enough together to insure that the electrode functions as a substantially cylindrical continuous electrode structure, which, when connected to the lead, increases the effective radius of the lead to the radius of the electrode. The potential gradient between the lead and its surrounding electrode is thus substantially zero, since they are at the same electrical potential, making it unnecessary to have more than a thin layer of solid insulation wrapped about the lead. Heat transfer from the lead conductor to the surrounding oil is thus promoted, making it unnecessary to increase the number of conductive strands in the lead. The electrode is connected to the lead at a single point, i.e., such that an electrical circuit is not established through the electrode. Since there will be no $I^2R$ losses in the electrode, it may be insulated with a heavy layer of solid insulation, if desired, without regard to impeding heat transfer. Thus, the electrode not only reduces the potential gradient in the oil by increasing the effective radius of the lead, but it may include solid insulation disposed about its outer surface to take advantage of the higher electrical strength and the higher dielectric constant of the solid insulation, such as crepe paper tape, and to also space the oil even further from the conductive portion of the electrode. FIGS. 2 through 6 illustrate different embodiments of the invention, using both solid and braided electrical conductor for the stress reducing electrode.

More specifically, FIG. 2 is an elevational view of the encased end 78 of an electrical bushing 80 having a terminal 82 to which an electrical lead 84 is electrically and mechanically secured. Bushing 80 extends below the level 84 of the liquid coolant disposed in the associated tank. Bushing 80 may be a bushing of a transformer, such as transformer 10 shown in FIG. 1, for an electrical reactor, or for a circuit breaker, and it may be at a potential when energized that would require heavy taping of lead 84 in order to prevent electrical breakdown of the surrounding oil. Instead of heavily taping lead 84, however, an electrode 90 is disposed in spaced relation about lead 84, and electrically connected thereto, as indicated schematically by lead 92. Electrode 90 is formed of a metallic conductor 94, as best shown in FIG. 2, taken along the line between arrows III—III. The metallic conductor of which electrode 90 is formed includes a plurality of spirally wound turns 96 which define a circular opening 98, or elliptical opening, if desired, which opening is dimensioned to receive the electrical lead 84 and provide a space between the lead 84 and the inside diameter of opening 98 for the cooling oil to flow. The spacing between the lead 84 and the inside diameter of opening 98 is maintained by spacer means, such as a plurality of insulating spacer blocks 100 and 102 which are fixed between predetermined turns 96 of the electrode 90 and the lead 84.

The plurality of turns 96 of electrode 90 are axially spaced from one another, as illustrated in FIG. 2, in order to enable the cooling oil to flow into and out of the opening between the spaced turns, as well as through the open ends of the electrode structure. The spacing between turns, however, should not be so great that the electrode ceases to function as a substantially continuous cylindrical electrode, as it must have this characteristic in order to reduce the potential gradient between the lead 84 and electrode 90 to substantially zero, and to increase the effective radius of the lead 84 to that of the electrode 90.

The electrode 90 may be preformed, and it may have a pigtail lead connected thereto, which is brazed to the conductive portion of lead 84, or to the terminal 82 on the encased end of bushing 80, to provide the connection 92 between the electrode 90 and the electrical potential at which the lead 84 is energized. Or, the pigtail connection may be initially connected to the electrical lead 84, and subsequently connected to the electrode 90. Since only a single electrical connection is made to electrode 90, no load current will flow therein, and there will be no I²R losses. Thus, as illustrated in FIG. 3, a layer of solid insulation 106 may be disposed about the outer surface of conductor 94, which will increase the effectiveness of electrode 90, as hereinbefore explained.

FIG. 4 is a fragmentary view of two interconnected leads 110 and 112, which may be the leads from two coils of transformer 10, completing a series connection between two adjacent coil groups. In this embodiment, when two leads 110 and 112 are to be joined, such as by brazing, it is convenient to provide two preformed electrodes 114 and 116, each of which may be constructed similar to the electrode 90 shown in FIGS. 2 and 3, each having a plurality of axially spaced turns formed of an insulated electrical conductor. In preparation for making the connection between leads 110 and 112, the end of each lead would be prepared for brazing and electrodes 114 and 116 would be placed over the leads 110 and 112, respectively. The two spiralled electrodes 114 and 116 may then be compressed to provide clearance for making the braze between the two leads. Pigtails, illustrated schematically at 110 and 120 are then connected from electrodes 114 and 116, respectively, to the interconnected lead structure. A thin layer of insulating tape may be wound about the brazed connection formed between the leads, and the connection between the leads and the pigtails, and the electrode structures 114 and 116 may be rigidized and spaced from their associated leads with insulating spacer means, as hereinbefore described.

FIG. 5 illustrates a tap changer lead 130 connected between a terminal 132 of a tap changer, such as the tap changer 60 shown in FIG. 1, and a tap lead 134 from a coil or winding. A spiral electrode 136 having a plurality of turns 138 is disposed about lead 130 and the necessary portions of terminal 132 and coil lead 134. A pigtail 140 is connected from electrode 136 to lead 130 or to terminal 132, to energize electrode 136 at the same potential as lead 130.

Instead of using a solid conductor for the stress reducing electrode, it would also be suitable to use a flexible braided conductor. This embodiment of the invention is shown in FIG. 6. FIG. 6 is a fragmentary view of a lead 150 having a plurality of metallic conductive strands 152, formed into a coherent structure with a thin layer 154 of insulating tape. A tubular corrugated pressboard insulating structure 156 is disposed about lead 150, which has spiralled furrows 158 and ridges 160. Slots 161 are formed or cut into ridges 160, to enable oil flow through the wall of the insulating structure 156. The insulating structure 156 is spaced from lead 150 by a suitable spacer means (not shown). A conductor 170 is wound about the insulating structure 156, by placing the conductor 170 in the spiralled furrow 158.

Conductor 170 includes a flexible, braided conductive strand portion 172, with the conductive strands being woven tightly about an insulating core member 174. The insulating core member 174 may be formed of a cellulosic insulation, such as cotton fibers, a silicon rubber, or any other suitable insulating material. The braided or woven conductors 172 include a large plurality of relatively fine metallic wires or strands. The individual wires or strands 174 are woven to provide a substantial angle between their direction and the longitudinal direction of the insulating core member 174, allowing the conductor 170 to be easily shaped to conform to the furrows 158 in the insulating structure 156, and it also allows the length of conductor 170 to change along with any changes in the dimensions of structure 156 during the various manufacturing steps in the construction of the associated electrical power apparatus.

While the diameter of the strands 172 is not critical, the diameter should be selected to be as small as practical. Very small or fine diameter strands provide a substantially smooth outer surface on the resulting woven conductor, which is necessary in order to reduce the potential gradient at its surface. Very fine strands are also desirable because they are individually so flexible that any broken ends that may extend outwardly from the surface of the woven conductor will be bent inwardly to conform to the surface of the conductor when the conductor is insulated, such as with a layer 176 of paper insulation, as illustrated in FIG. 6. Small diameter strands also aid the structure electrically, as reducing the diameter of the strands increases their resistance to the flow of eddy currents, produced when the electrode is subjected to a high leakage field. Copper strands, each having a diameter of 0.0063 inches are suitable for the woven conductor, but other diameters and other metals, such as aluminum, stainless steel, and the like, may be used.

In summary, there has been disclosed new and improved electrical power apparatus having a casing filled with a fluid coolant, such as mineral oil, and having at least one electrical lead disposed in the tank which is immersed in the coolant and which is at an elevated electrical potential when the power apparatus is energized. The electrical lead is surrounded with an electrode which is connected to the lead, reducing the potential gradient between the electrode and lead to substantially zero, and increasing the effective radius of the lead to the radius of the surrounding electrode. The electrode is formed of an electrical conductor having a plurality of axially spaced turns, and the inside diameter of the turns is spaced from the electrical lead. Thus, the coolant may flow adjacent to the lead, through the openings at the ends of the electrode, and also between the turns of the electrode. Since there is little potential gradient adjacent to the lead surface, it need have only a thin layer of insulating tape. Thus, the oil flowing over its surface will efficiently remove heat therefrom. Since the electrode does not carry load current, it may be insulated to increase its effectiveness, as the insulation will not impede the transfer of any heat. In addition to effectively reducing the potential gradient adjacent an electrical lead, and promoting heat transfer from the lead, the lead structure need not be modified by addition additional conductive strands thereto, which strands may increase the losses in the lead due to circulating currents, and the stress reducing structure taught by the invention may be manufactured for a relatively low cost, and quickly and easily assembled with an associated lead structure at the time of manufacturing the associated electrical power apparatus.

We claim as our invention:

1. Electrical power apparatus adapted for energization by a source of electrical potential, comprising:
    a casing,
    fluid cooling means disposed in said casing,
    at least one electrical lead disposed in said casing and immersed in said fluid cooling means,
    said at least one electrical lead being at an elevated electrical potential when the electrical power apparatus is energized,
    an electrode, including an electrically conductive member having a plurality of continuous, axially spaced turns, defining a predetermined opening through the electrode,
    said at least one electrical lead extending through the predetermined opening in said electrode,
    spacer means disposed to space said at least one electrical lead from the turns of said electrode,
    and means interconnecting said at least one electrical lead and said electrode, to increase the effective radius of said at least one electrical lead and reduce the potential gradient surrounding said at least one electrical lead, while enabling free flow of said fluid cooling means adjacent to said at least one electrical lead.

2. The electrical power apparatus of claim 1 wherein the at least one electrical lead includes electrical conductor means having insulating means disposed about the outer surface of the electrical conductor means.

3. The electrical power apparatus of claim 2 wherein the electrode disposed about the at least one electrical lead includes insulating means disposed about the outer surface of its turns.

4. The electrical power apparatus of claim 1 wherein the electrode disposed about the at least one electrical lead includes insulating means disposed about the outer surface of its turns.

5. The electrical power apparatus of claim 1 including an insulating bushing sealingly disposed through the casing, with the at least one electrical lead being connected to said insulating bushing.

6. The electrical apparatus of claim 1 including an electrical winding and a tap changer disposed within the casing, with the at least one electrical lead interconnecting said electrical winding and said tap changer.

7. The electrical apparatus of claim 1 including an electrical winding having a plurality of spaced coils disposed in the casing, and the at least one electrical lead interconnects two of said plurality of spaced coils.

8. The electrical apparatus of claim 1 wherein the spacer means includes a corrugated tubular insulating member having spirally disposed furrows and ridges, with the turns of the electrode being disposed in the furrows, and including slots formed in the ridges to promote circulation of the fluid cooling means adjacent to the at least one electrical lead.

9. The electrical power apparatus of claim 8 wherein the electrode includes a plurality of electrically conductive strands woven together about an insulating core member.

10. The electrical apparatus of claim 1 wherein the electrode includes a plurality of electrically conductive strands woven together about an insulating core member.

11. The electrical power apparatus of claim 1 wherein the electrode has a solid metallic cross-section, and insulating means disposed about the outer surface of the solid metallic member.

12. The electrical power apparatus of claim 1 wherein the fluid cooling means is mineral oil.

13. The electrical power apparatus of claim 1 including at least two electrical coils, with the at least one electrical lead including an end of each coil, and means interconnecting the ends of the coils, and including a second electrode having a plurality of turns defining an opening, with the at least one electrical lead also extending through the opening in the second electrode, and including means connecting the second electrode to the at least one electrical lead.

14. The electrical power apparatus of claim 1 wherein the means interconnecting the at least one electrical lead and the electrode contacts only a single turn of the electrode, to maintain the electrode at the potential of the at least one lead without heating the electrode due to current flow.

* * * * *